(12) United States Patent
West (10) Patent No.: US 9,937,959 B2
(45) Date of Patent: Apr. 10, 2018

(54) MUD FLAP SYSTEM (71) Applicant: TRUCKMOVERS.COM, INC., Independence, MO (US)

(72) Inventor: Dean West, Independence, MO (US)

(73) Assignee: TRUCKMOVERS.COM INC., Independence, MO (US)

( * ) Notice: Subject to any disclaimer, the term of this patent is extended or adjusted under 35 U.S.C. 154(b) by 0 days.

(21) Appl. No.: 15/722,708

(22) Filed: Oct. 2, 2017

(65) Prior Publication Data

US 2018/0022393 A1 Jan. 25, 2018

Related U.S. Application Data (63) Continuation of application No. 15/588,318, filed on May 5, 2017, now Pat. No. 9,776,672, which is a continuation of application No. 14/510,671, filed on Oct. 9, 2014, now Pat. No. 9,643,657.

(60) Provisional application No. 61/888,743, filed on Oct. 9, 2013.

(51) Int. Cl.
    B62D 35/00 (2006.01)
    B62D 25/16 (2006.01)
    B62D 25/18 (2006.01)

(52) U.S. Cl.
    CPC .......... *B62D 25/166* (2013.01); *B62D 25/168* (2013.01); *B62D 25/182* (2013.01)

(58) Field of Classification Search
    CPC ........................... B62D 25/161; B62D 25/166
    See application file for complete search history.

(56) References Cited

U.S. PATENT DOCUMENTS

2015/0259013 A1* 9/2015 Dixon ................. B62D 25/182
                                                        280/154

* cited by examiner

*Primary Examiner* — John D Walters
*Assistant Examiner* — James J Triggs
(74) *Attorney, Agent, or Firm* — Polsinelli PC (57) ABSTRACT A mud flap system for a tractor is described. The mud flap system includes brackets that clamp or secure to a frame of the tractor. Lateral extensions engage to the brackets to support covers over a top surface of rear wheels of the tractor.

20 Claims, 7 Drawing Sheets

MUD FLAP SYSTEM

CROSS REFERENCE TO RELATED APPLICATION

This application is a continuation of U.S. Pat. No. 9,776,672 filed May 5, 2017 which is a continuation of U.S. Pat. No. 9,643,657 filed Oct. 9, 2014 which claims the benefit of U.S. Provisional Patent Application No. 61/888,743 filed Oct. 9, 2013, which are both hereby incorporated by reference in their entireties.

FIELD OF INVENTION

The present invention relates to a mud flap system for a tractor.

SUMMARY OF INVENTION

A mud flap system for a tractor is described. The mud flap system includes brackets that clamp or secure to a frame of the tractor. Lateral extensions engage to the brackets to support covers over a top surface of rear wheels of the tractor.

The mud flap system may be installed on a first tractor to prevent rock and other road debris from striking a second tractor that is pulled behind the first tractor. Often, one tractor pulls another tractor in tandem for transportation and/or delivery. The second tractor may be damaged by rocks and other road debris kicked up by the first tractor, which may result in costly damage to the second tractor. The covers of the mud flap system reduce and/or prevent the rocks and the road debris from striking the second tractor.

The mud flap system clamps or secures to the frame of the first tractor in a removable manner. When the mud flap system is no longer needed, the mud flap system may be easily removed from the first tractor. For example, after delivery of the second tractor, the mud flap system may be removed or uninstalled from the first tractor. Importantly, the mud flap system clamps or secures to the first tractor in a non-destructive manner, i.e., no holes, drillings, or other permanent modifications are required on the first tractor when installing the mud flap system on the first tractor.

In one aspect, a mud flap system for a tractor is described. The mud flap system includes a front driver side bracket, a front passenger side bracket, a rear driver side bracket, and a rear passenger side bracket. Lateral extensions connect to each bracket. The mud flap system includes a driver side cover and a passenger side cover. The lateral extensions support the driver side cover and the passenger side cover.

In another aspect, a mud flap system for a tractor is described. The mud flap system includes a bracket to clamp to a frame of the tractor. A lateral extension connects with the bracket. The lateral extension supports a cover over rear wheels of the tractor.

In another aspect, a method for installing a mud flap system for a tractor is described. The method includes providing a bracket, a lateral extension to connect with the bracket, and a cover. The method includes clamping, engaging, or securing the bracket to a frame of the tractor. The method includes engaging the lateral extension to the bracket. The method includes supporting the cover with the lateral extension. The method includes rotating the lateral extension to tighten the cover. The method includes fixing the position of the lateral extension relative to the bracket.

In another aspect, an axle holding assembly is described to provide storage for drive axles that have been removed from a towed truck. The axle holding assembly includes a cross member that is engaged to a bracket. The cross member includes a first side and a second side. Each of first side and the second side may support or hold ends of the drive axles. The axle holding assembly may be engaged to the mud flap systems described herein.

DETAILED DESCRIPTION OF INVENTION

A mud flap system 10 will now be described with reference to FIGS. 1-11. The mud flap system 10 clamps or secures to a tractor 20. The mud flap system 10 may removably engage to a frame 40 of the tractor 20 to cover rear wheels 30 of the tractor 20.

Figure 1:
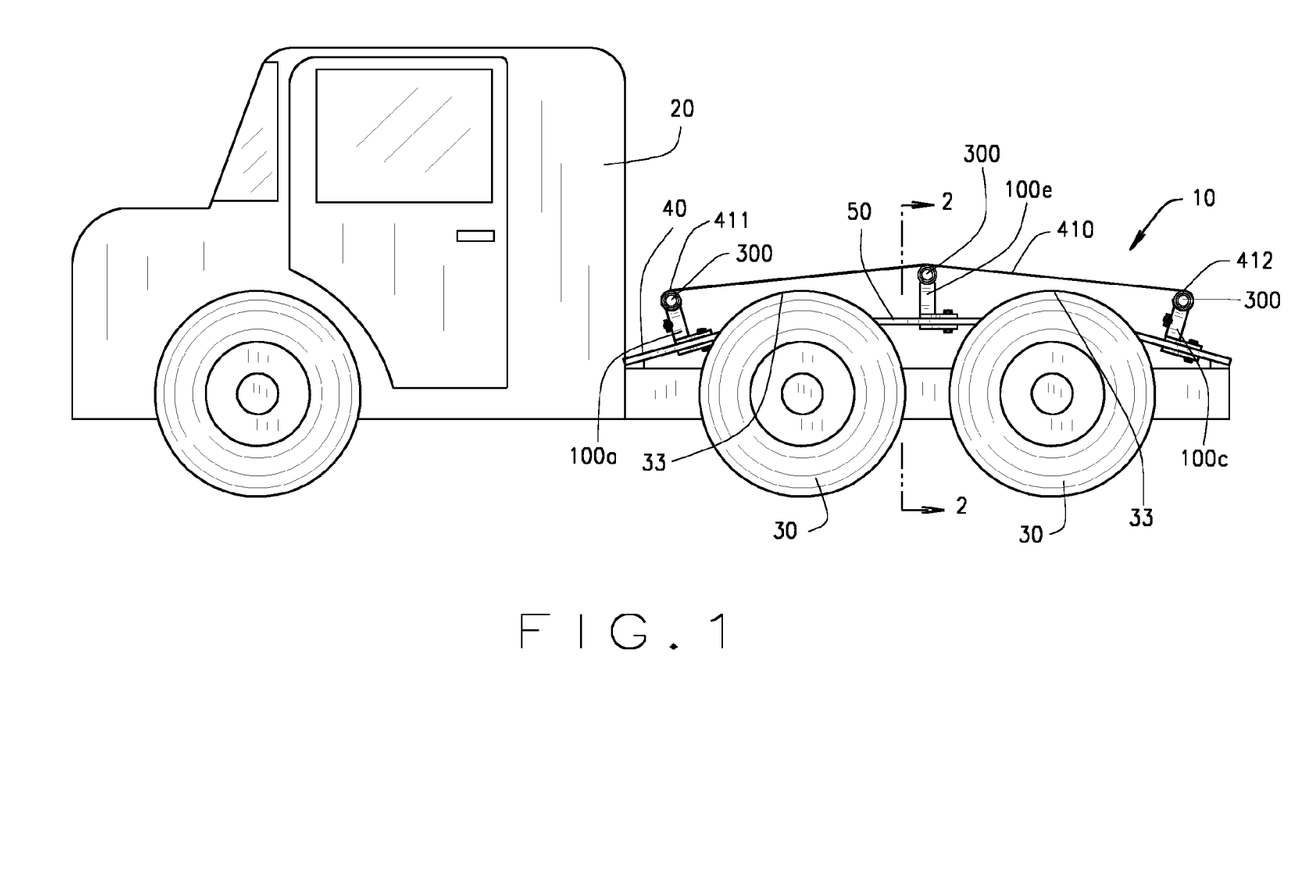
FIG. 1 is a side view of the tractor with the mud flap system installed.
Figure 2:
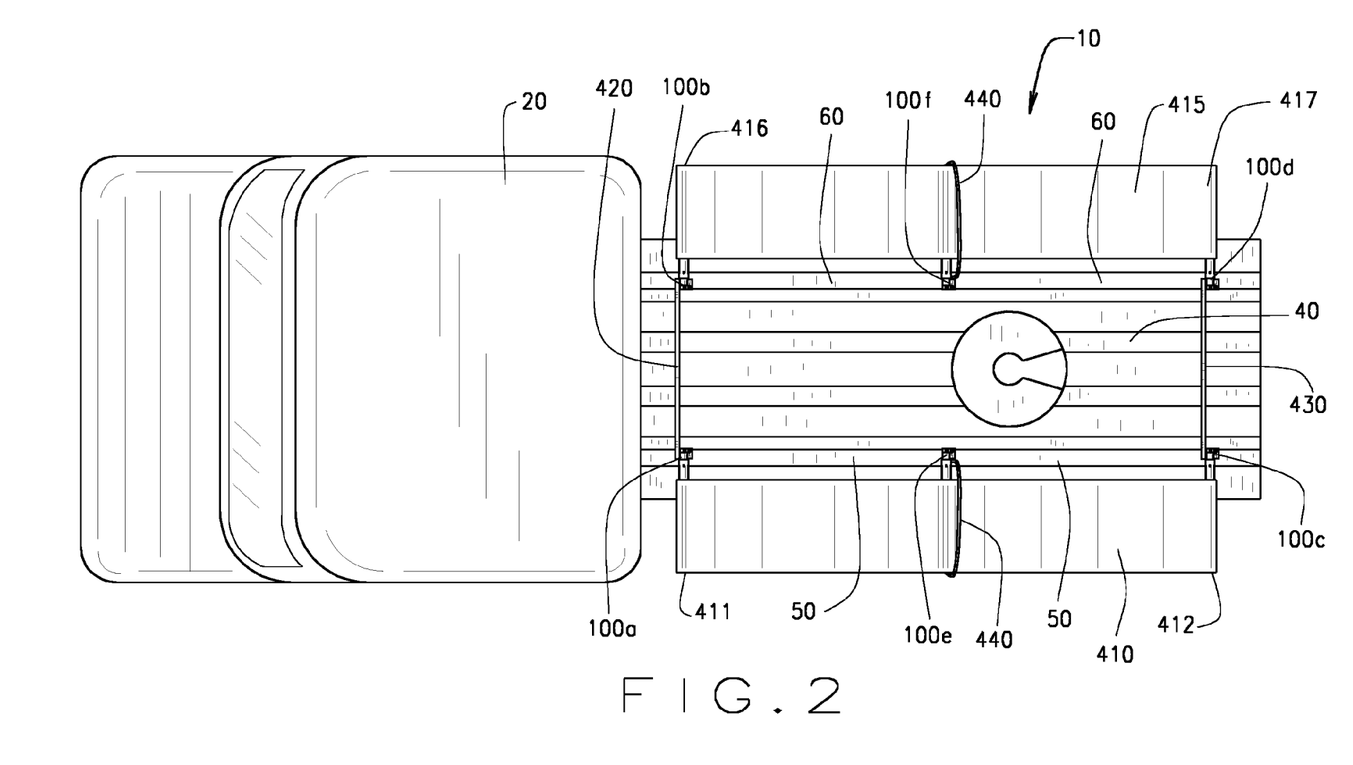
FIG. 2 is a top view of the tractor with the mud flap system installed.
Figure 3:
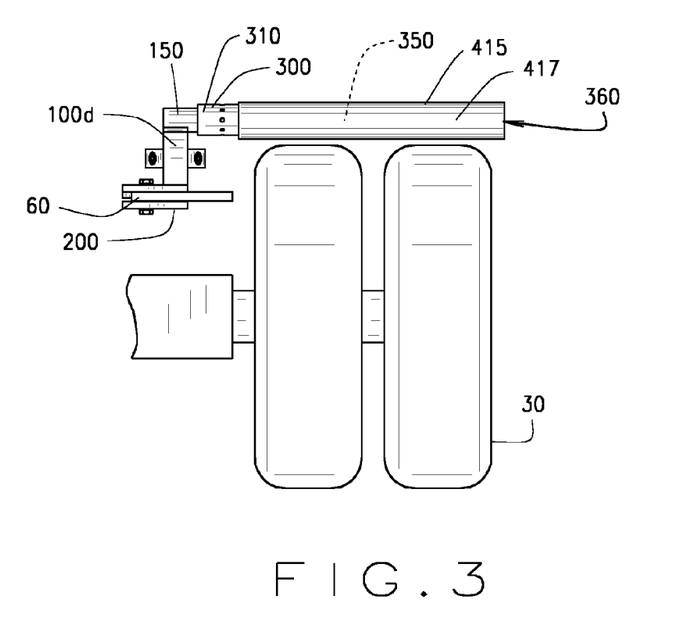
FIG. 3 is a partial view of the mud flap system installed over the tires of the tractor.

The mud flap system 10 includes a driver side cover 410 and a passenger side cover 415 positioned over top surfaces 33 of the rear wheels 30. A front driver side bracket 100a clamps to a driver side frame 50, and a rear driver side bracket 100c clamps to the driver side frame 50. The driver side cover 410 extends from the front driver side bracket 100a to the rear driver side bracket 100c. Likewise, a front passenger side bracket 100b clamps to a passenger side frame 60 and a rear passenger side bracket 100d also clamps to the passenger side frame 60. The passenger side cover 415 extends from the front passenger side bracket 100b to the rear passenger side bracket 100d. An optional middle driver side bracket 100e may also clamp to the driver side frame 50 and support a central portion of the driver side cover 410. Likewise, an optional middle passenger side bracket 100f may clamp to the passenger side frame 60 and support a central portion of the passenger side cover 415. The middle brackets 100e and 100f provide additional support to the respective covers 410 and 415.

The brackets 100a-f will now be described. The brackets 100a-f each include a clamp 200 to clamp, secure, or otherwise engage to their respective frame 50 or 60. The brackets 100a-f may each include a similar construction, although the passenger side brackets 100b, 100d, and 100f may have an opposite orientation than the driver side brackets 100a, 100c, and 100e. A vertical member 110 extends from the clamp 200. A lateral extension 300 connects to the vertical member 110.

Figure 4:
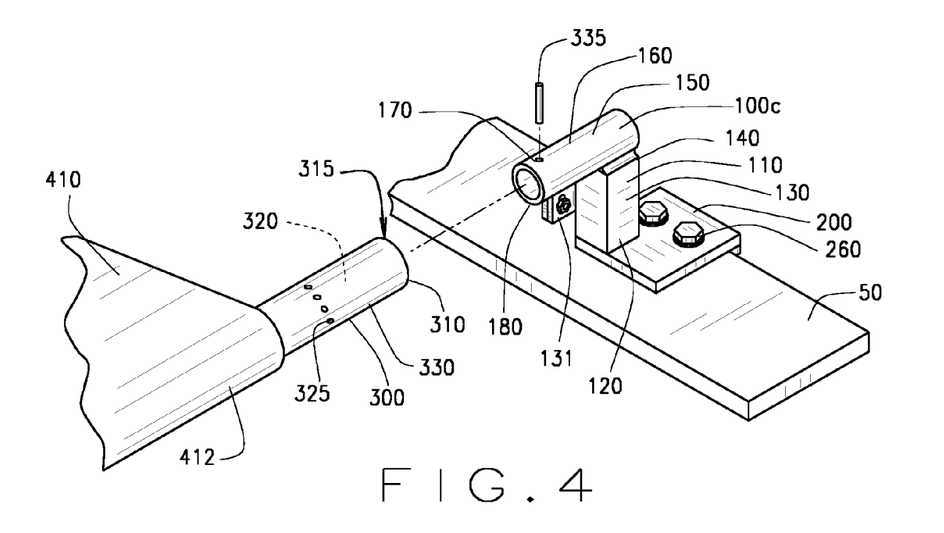
FIG. 4 is a view of the lateral extension engaging to the connection portion.

With reference to FIG. 4, the connection of the lateral extension 300 to the vertical member 110 will now be described. The vertical member 110 includes a lower end 120, a central portion 130, and an upper end 140. The vertical member 110 extends generally vertically from the clamp 200. The upper end 140 of the vertical member 110 includes a connection portion 150. The connection portion 150 angles outward away from the frame 40. For example, the connection portion 150 may angle outward in a generally perpendicular manner from the vertical member 110. The connection portion 150 forms a male member that is inserted into an inside end 310 (or female end) of the lateral extension 300. The connection portion 150 may include a rounded structure forming an external surface 160. Holes 170 may be positioned about a diameter 180 of the external surface 160. The inside end 310 of the lateral extension 300 forms an opening 315 that fits over the connection portion 150. An internal surface 320 of the inside end 310 fits over the connection portion 150. The inside end 310 includes holes 325 about a diameter 330 of the inside end 310. An engaging member, such as a cotter pin 335, fixedly connects the holes 170 of the connection portion 150 with the holes 325 of the inside end 310.

The lateral extensions 300 will now be described. The lateral extensions 300 may include a tube-like structure. The lateral extensions 300 generally extend perpendicular to the frame 40 of the tractor 20. The lateral extensions 300 include the inside end 310 opposite of an outside end 360. A central portion 350 spans a distance between the inside end 310 and the outside end 360. The lateral extensions 300 may have a generally linear shape and may be generally hollow or have hollow portions at the inside end 310. The lateral extensions 300 may have a generally rounded shape or have rounded portions at the inside end 310.

Figure 5:
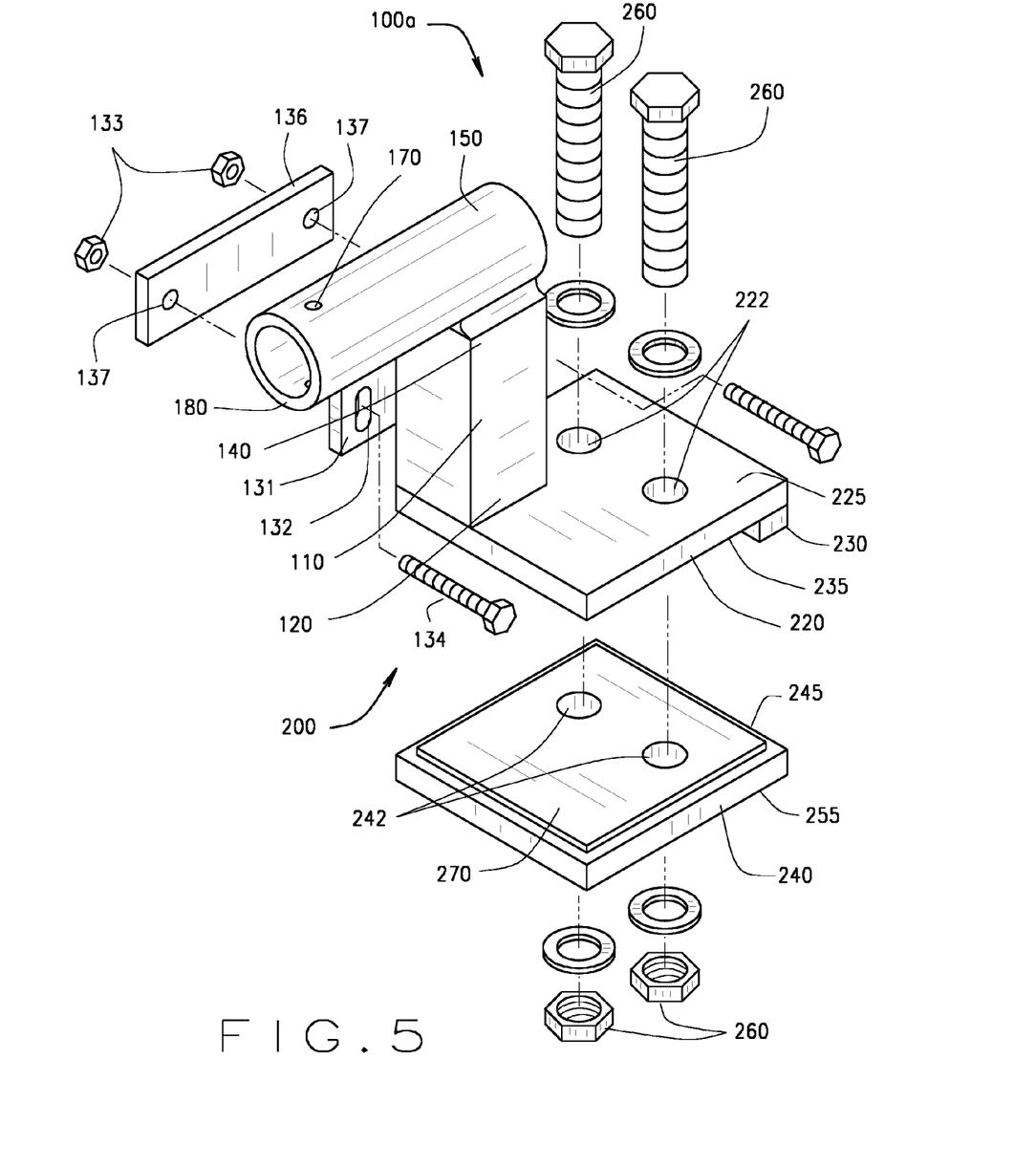
FIG. 5 is an exploded view of the bracket.

With reference to FIG. 5, the engagement of the clamp 200 to the frame 40 will now be described. The lower end 120 of the vertical member 110 fixedly engages to the clamp 200. The clamp 200 includes an upper clamp member 220 and a lower clamp member 240. A spacer 230 may be positioned between the upper clamp member 220 and the lower clamp member 240 to provide for the clamping action of the clamp 200. The upper clamp member 220 forms an upper surface 225 and a lower surface 235. The upper clamp member 220 includes openings 222. The lower clamp member 240 forms an upper surface 245 and a lower surface 255. The lower clamp member 240 includes openings 242. Tighteners 260 may pass through the openings 222 and 242 to clamp the upper clamp members 220 and the lower clamp member 240 about either the frame 50 or the frame 60. The tighteners 260 may include a nut and bolt connection that may be easily tightened and/or removed. Liners 270, such as a pad-like material, may be positioned between the lower surface 235 and the frames 50 or 60. Liners 270 may also be positioned between the frame 50 or 60 and the upper surface 245. The liners 270 prevent the upper clamp member 220 and the lower clamp member 240 from scratching or otherwise marring a surface of the frame 50 or 60.

In other aspects, the upper clamp member 220 and the lower clamp member 240 may also be biased to a clamping or closing position via springs or other mechanical biasing members. The upper clamp member 220 and the lower clamp member 240 may also be hingedly connected to sandwich about the frame 50 or 60. In other aspects, the clamp 200 may be an integral unit with an opening to receive the frame 50 or 60.

The driver side cover 410 and the passenger side cover 415 will now be described. The driver side cover 410 includes a front seam 411 and a rear seam 412. Likewise the passenger side cover 415 includes a front seam 416 and a rear seam 417. The lateral extensions 300 each pass through one of the front seam 411, the rear seam 412, the front seam 416, or the rear seam 417. The respective lateral extension 300 may be fixedly attached, via screws or other fasteners, to the respective seam 411, 412, 416, or 417. As such, rotating the lateral extension 300 may tighten or wind-up the respective cover 410 or 415 on the lateral extension 300. For example, one or both of the lateral extensions 300 may be wound by an operator to reduce the length of the cover 410 or 415. Once the covers 410 or 415 are at the correct length for travel, the lateral extensions 300 may be staked or locked in position by passing the cotter pin 335 through the holes 170 of the connection portion 150 and the holes 325 of the inside end 310.

The covers 410 and 415 may include a length of fabric sized to approximately cover the width of the rear wheels 30 and the length of the rear wheels 30. The fabric may include durable synthetic materials or synthetic blends that resist rot, punctures, and stretching.

A front brace member 420 and a rear brace member 430 will now be described. The front brace member 420 may fixedly connect to the front driver side bracket 100a and to the front passenger side bracket 100b. Likewise, the rear brace member 430 may fixedly engage the rear driver side bracket 100c and to the rear passenger side bracket 100d. The brace members 420 and 430 may include a bar or a length of a rigid material that is welded, fastened, or otherwise rigidly connects the respective brackets 100a and 100b or 100c and 100d.

The front brace member 420 extends across a width of the frame 40. Likewise the rear brace member 430 extends across the width of the frame 40. The respective brace members 420 and 430 assist when the lateral extensions 300 are rotated in order to tighten the respective covers 410 and 415. For example, during installation, the rear brace member 430 prevents the rear passenger side bracket 100d from moving when the lateral extension 300 engaged to the front passenger side bracket 100b is rotated to tighten the cover 415. For example, the tightening of the cover 415 at the front passenger side bracket 100b pulls on the rear passenger side bracket 100d in a counter-clockwise manner, but the rear brace member 430 prevents or resists the rear passenger side bracket 100d from rotating in the counter-clockwise direction.

Figure 6:
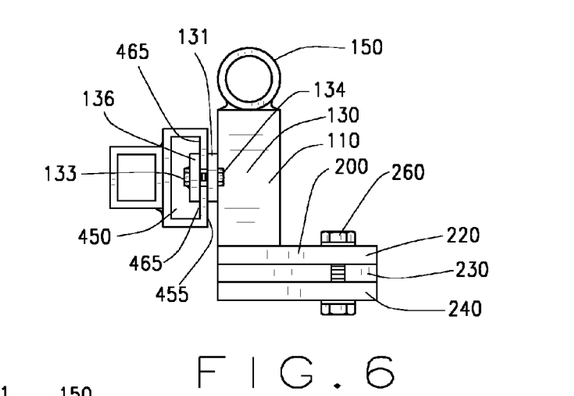
FIG. 6 is an end view of the brace member installed to the bracket.
Figure 7:
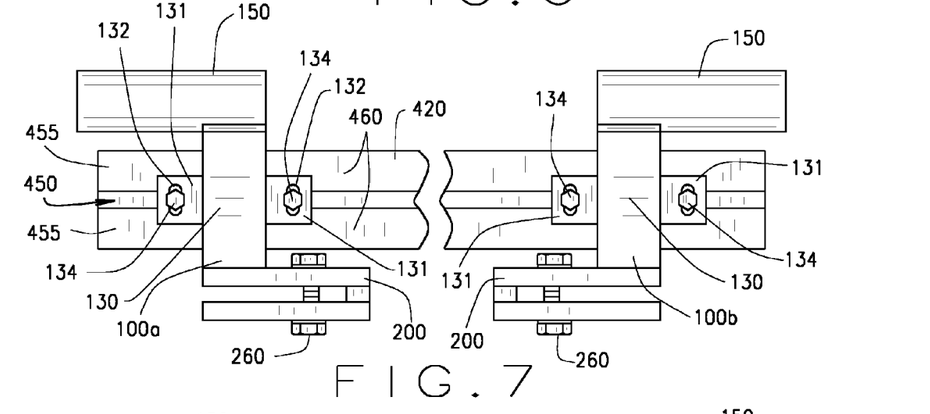
FIG. 7 is a front view of the brace member installed to the bracket.
Figure 8:
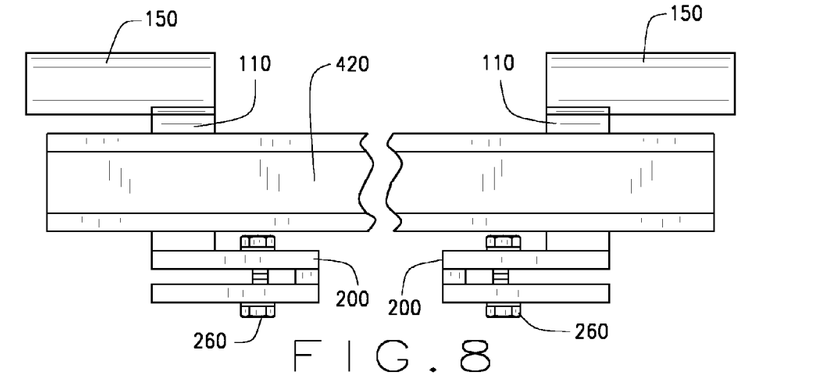
FIG. 8 is a rear view of the brace member installed to the bracket.

With reference to FIGS. 6-8, the connection of the brace members 420 and 430 to the brackets 100a-100d will now be described. In one aspect, the brace members 420 and 430 form channels 450 on their ends which engage with opposing brackets 100a-100d. The channels 450 provide a level of adjustability to the brace members 420 and 430 with respect to the brackets 100a-100d. In this aspect, the brackets 100a-100d may include a fixed plate 131 and an inside plate 136, which clamp or squeeze to the channels 450. The channels 450 are defined by channel walls 455, which are spaced a distance from an exterior surface of the brace members 420 and 430. The fixed plate 131 is welded or fixedly attached to the central portion 130 of the respective bracket 100a-100d. The fixed plate 131 includes holes 132 which receive a bolt 134. The fixed plate 131 is positioned against an exterior surface 460 of the channel walls 455. A nut 133 is tightened on the bolt 134. The inside plate 136 is positioned against an interior surface 465 of the channel walls 455. The inside plate 136 includes holes 137 about which the nut 133 is welded or fixedly attached. By tightening the bolt 134, the fixed plate 131 and the inside plate 136 clamp or squeeze on the channel walls 455. The nut 133 is interior to the channel walls 455 and is difficult to access with a wrench or a like. As such, the nut 133 may be welded or fixedly attached to the inside plate 136 so it does not spin or rotate when the bolt 134 is tightened. Before the bolt 134 is fully tightened, the brace member 420 or 430 may be laterally adjusted by moving the brace member 420 or 430 along the length of the channels 450. During the movement, the channel 450 may slide around and past the bolt 134.

Optional support straps 440 may also engage to the outside end 360 of the extensions 300, pass over a top surface of the cover 410 or 415, and connect to the inside end 310. The support straps 440 may include a stretchable length of an elastomeric material that may be stretched to span the width of the cover 410 or 415. The support straps 440 provide a downward pressure on the top surface of the cover 410 or 415.

Figure 9:
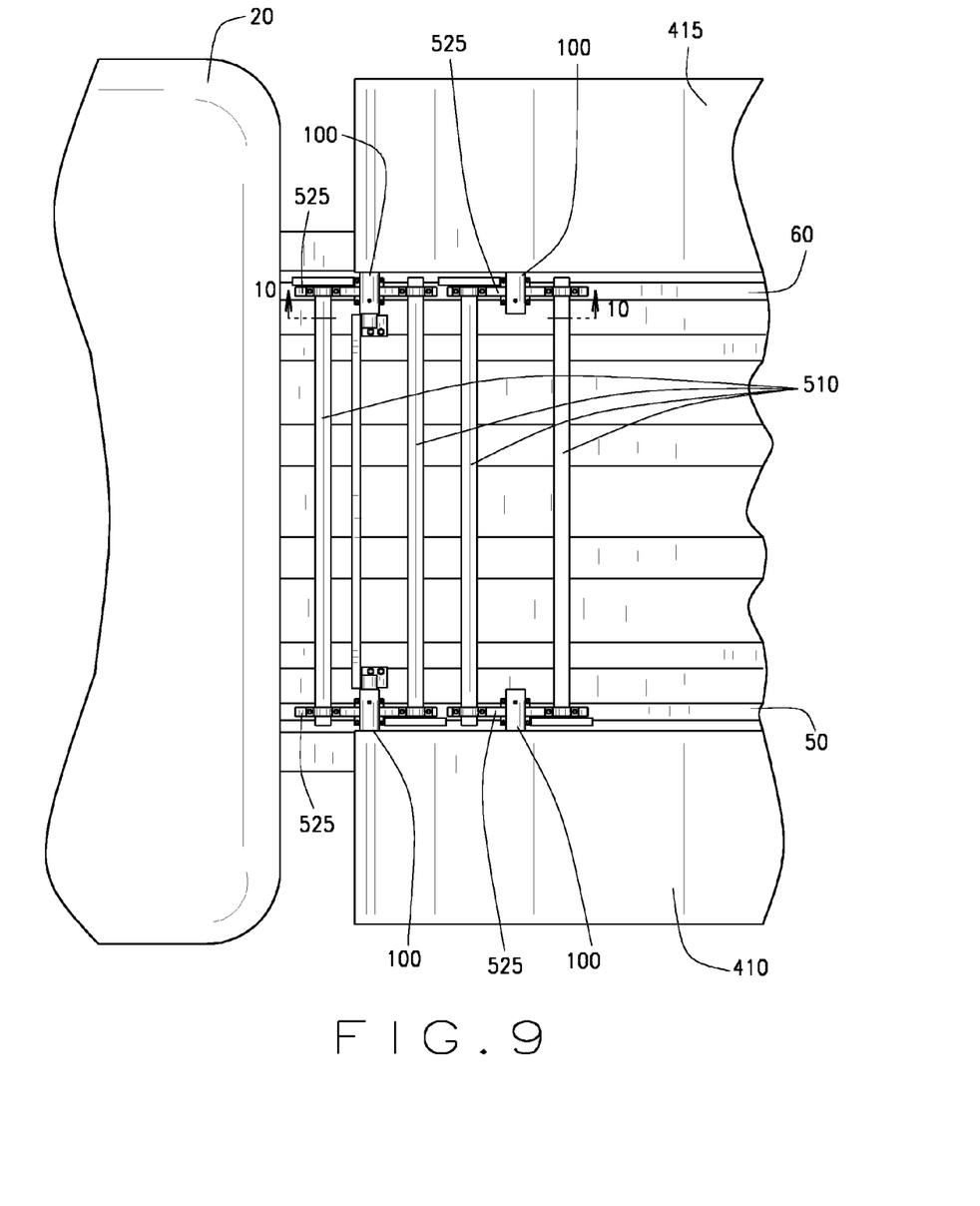
FIG. 9 is a top down view of the axle holding assembly.
Figure 10:
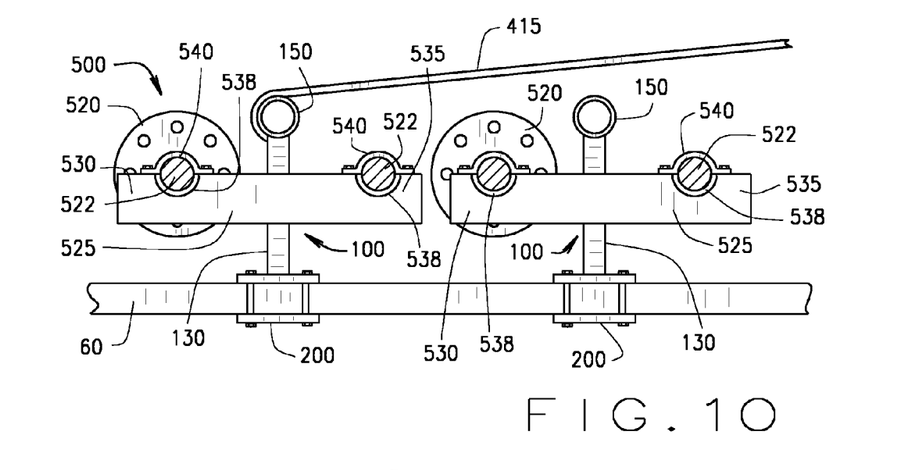
FIG. 10 is a side view of the axle holding assembly.
Figure 11:
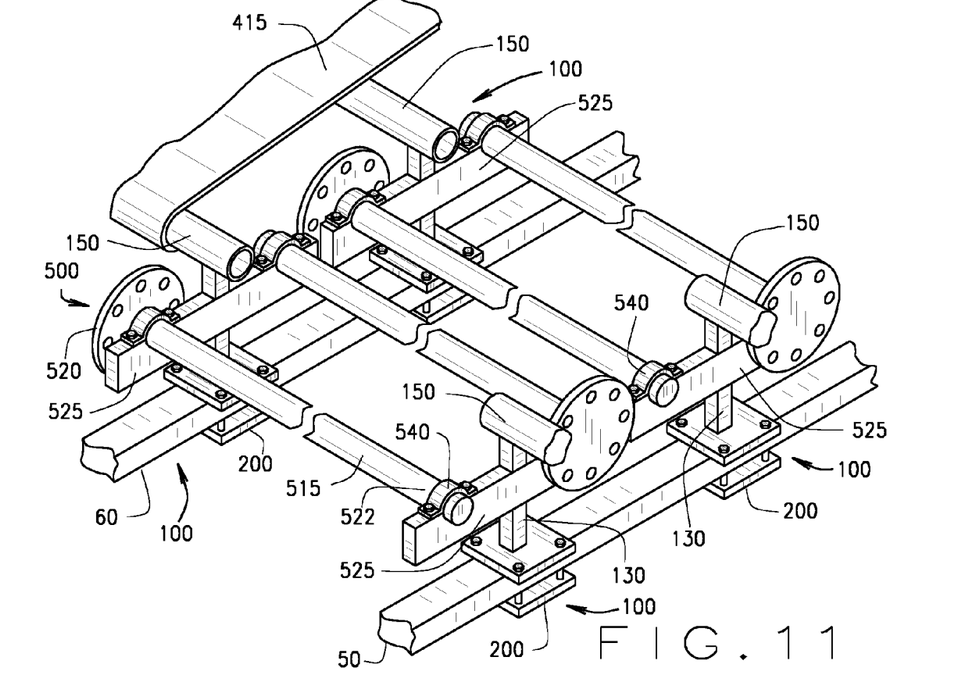
FIG. 11 is a perspective view of the axle holding assembly.

With respect to FIGS. 9-11, an axle holding assembly 500 is engaged to the brackets 100. The axle holding assembly 500 may optionally be used with the mud flap system 10. The axle holding assembly 500 provides for safe and convenient storage for drive axles 510 that have been disengaged from a tractor that is being towed by the tractor 20. The towed tractor still has its other axles, commonly referred to as tag axles and pusher axles, which allow for the towed tractor to be towed on the road. When towing a tractor, the drive axles 510 are preferably removed from the towed tractor in order to prevent or reduce the likelihood for any damage to occur to the transmission and/or drive train of the towed tractor. A single axle tractor will have two drive axles 510 that are removed and stored, while a tandem axle tractor will have four drive axles 510 that are removed and stored. The drive axles 510 are positioned on the axle holding assemblies 500 for storage during transportation. In the aspect shown in FIGS. 9-11, the drive axles 510 extend across the width of the tractor 20, e.g., the drive axles 510 are positioned generally perpendicular to the direction of travel of the tractor 20.

The drive axles 510 generally include a shaft 515 having an end plate 520 on a first end that is generally opposite of a spline 522 on a second end. The drive axles 510 are generally almost as long as the width of tractor, and each drive axle 510 weighs approximately 80 pounds. The axle holding assemblies 500 provide for safe and convenient storage of the drive axles 510.

The axle holding assembly 500 includes a cross member 525 that is engaged to the bracket 100. The cross member 525 is arranged in a generally perpendicular fashion to the central portion 130 of the bracket 100. The cross member 525 includes a first side 530 and a second side 535. Each of first side 530 and the second side 535 may include a recess 538, such as a semi-circular or arcuate portion that holds or receives the shaft 515. The recess 538 is generally sized larger than an outer diameter of the shaft 515, such that the shaft 515 fits at least partially into the recess 538.

The cross member 525 on a driver side of the tractor 20 holds the first end of the drive axle 510, while a cross member 525 on the passenger side of the tractor 20 holds the second end of the same drive axle 510. The cross members 525 may be welded, bolted, integrally formed, or otherwise attached to the central portion 130 of the bracket 100. The cross members 525 may be welded, bolted, integrally formed, or otherwise attached to the vertical member 110 between the clamp 200 and the lateral extension 300.

The axle holding assemblies 500 are generally positioned in front of the fifth wheel of the tractor 20. With reference to FIG. 10, each cross member 525 includes the first side 530 and the second side 535. Each of the first side 530 and the second side 535 of the cross member 525 includes an axle fastener 540, such as a strap or band that fastens to either the first side 530 or the second side 535 of the cross member 525. The axle fastener 540 holds or positions the drive axle 510 onto the first side 530 or onto the second side 535 of the cross member 525. The axle fastener 540 may span over or above the recess 538 and holds the axle 510 to the cross member 525. The first side 530 or the second side 535 of the drive axle 510 may rest on a top surface of the cross member 525 or in the recess 538. In this aspect, the axle fastener 540 is a curved band that fits over the drive axle 510 and is bolted to the cross-member 525.

It should be understood from the foregoing that, while particular embodiments of the invention have been illustrated and described, various modifications can be made thereto without departing from the spirit and scope of the present invention. Therefore, it is not intended that the invention be limited by the specification; instead, the scope of the present invention is intended to be limited only by the appended claims.

What is claimed:
1. A mud flap system for a tractor, comprising:
a front bracket and a rear bracket, and wherein the brackets engage to a frame of the tractor;
lateral extensions to connect to the brackets;
a cover, wherein the lateral extension support the cover over a rear wheel of the tractor;
the brackets include a vertical member;
the vertical member comprises a lower end, a central portion, and an upper end, wherein the upper end comprises a connection portion, and the lower end engages to the frame, wherein the lateral extensions connect with the connection portion of the vertical member; and,
the connection portion includes an external surface forming a diameter, wherein the connection portion comprises holes, and the holes of the connection portion are spaced about the diameter of the external surface.
2. The mud flap system according to claim 1, wherein the lower end comprises a clamp, and the clamp comprises an upper clamp member and a lower clamp member to clamp to the frame of the tractor.
3. The mud flap system according to claim 1, wherein the lower end comprises a clamp, and the clamp comprises a tightener to bias or close the clamp.
4. The mud flap system according to claim 1, wherein the lateral extensions include an inside end, a central portion, and an outside end.
5. The mud flap system according to claim 4, wherein the inside end includes a generally hollow, tubular construction, and the inside end fits over a rounded portion of the connection portion of the bracket.
6. The mud flap system according to claim 5, wherein the inside end rotatably engages the rounded portion of the connection portion, and the cover is tightened by rotating the lateral extension relative to the rounded portion of the connection portion.
7. The mud flap system according to claim 6, wherein holes are spaced about a diameter of the inside end, and an engaging member fixedly engages the inside end of the lateral extension to the connection portion.
8. The mud flap system according to claim 7, wherein the engaging member is a cotter pin that passes through the holes of the inside end and the holes of the connection portion.
9. The mud flap system according to claim 1, wherein a brace member joins the front bracket and the rear bracket.

10. A mud flap system for a tractor, comprising:
a front bracket and a rear bracket, and wherein the brackets engage to a frame of the tractor;
lateral extensions to connect to the brackets;
a cover, wherein the lateral extensions support the cover over a rear wheel of the tractor;
the brackets include a vertical member;
the vertical member comprises a lower end, a central portion, and an upper end, wherein the upper end comprises a connection portion, and the lower end is secured to the frame of the tractor, wherein the lateral extensions connect with the connection portion of the vertical member; and,
the lateral extensions are rotatably engaged to the connection portions, and rotating the lateral extension winds the cover on the lateral extension to tighten the cover.

11. The mud flap system according to claim 10, wherein the front bracket is a front driver side bracket, the rear bracket is rear driver side bracket, and further comprising a front passenger side bracket and a rear passenger side bracket, and wherein the brackets engage to a frame of the tractor; and wherein a front brace member joins the front driver side bracket and the front passenger side bracket.

12. The mud flap system according to claim 11, wherein a rear brace member joins the rear driver side bracket and the rear passenger side bracket.

13. The mud flap system according to claim 11, wherein the front driver side bracket and the rear driver side bracket secure to a driver side frame of the tractor, and the front passenger side bracket and the rear passenger side bracket secure to a passenger side frame of the tractor.

14. The mud flap system according to claim 11, wherein the cover extends between the front driver side bracket and the rear driver side bracket.

15. The mud flap system according to claim 14, wherein another cover extends between the front passenger side bracket and the rear passenger side bracket.

16. A mud flap system for a tractor, comprising:
a front bracket and a rear bracket, and wherein the brackets engage to a frame of the tractor;
lateral extensions to connect to the brackets;
a cover, wherein the lateral extensions support the cover over a rear wheel of the tractor;
the brackets include a vertical member;
the vertical member comprises a lower end, a central portion, and an upper end, wherein the upper end comprises a connection portion, and the lower end is configured to secure to the frame of the tractor, wherein the lateral extensions connect with the connection portions of the vertical member; and,
the lateral extensions include an inside end, a central portion, and an outside end; and, wherein the inside end includes a generally hollow, tubular construction, and the inside end fits over a rounded portion of the connection portion of the bracket.

17. The mud flap system according to claim 16, wherein the mud flap system comprises a brace member that joins the front bracket and the rear bracket.

18. The mud flap system according to claim 16, wherein the front bracket is a front driver side bracket, the rear bracket is rear driver side bracket, and further comprising a front passenger side bracket and a rear passenger side bracket, wherein a first brace member joins the front driver side bracket and the rear driver side bracket, and wherein a second brace member joins the front passenger side bracket and the rear passenger side bracket.

19. The mud flap system according to claim 16, wherein the front bracket is a front driver side bracket, the rear bracket is a rear driver side bracket, and further comprising a front passenger side bracket, a rear passenger side bracket, a middle driver side bracket, and a middle passenger side bracket.

20. The mud flap system according to claim 19, wherein the lateral extensions connect with the middle driver side bracket to the support the cover.

* * * * *